(12) United States Patent
Zoister et al.

(10) Patent No.: US 8,646,688 B2
(45) Date of Patent: Feb. 11, 2014

(54) SECURITY ELEMENT WITH SPATIALLY RESOLVED MAGNETIC CODING, METHOD AND DEVICE FOR THE PRODUCTION OF THE SAME AND ITS USE

(75) Inventors: Stefan Zoister, Perg (AT); Matthias Müller, Bechtsrieth (DE); Martin Bergsmann, Linz (AT)

(73) Assignee: Hueck Folien Ges.m.b.H., Baumgartenberg (AT)

( * ) Notice: Subject to any disclaimer, the term of this patent is extended or adjusted under 35 U.S.C. 154(b) by 858 days.

(21) Appl. No.: 11/918,779

(22) PCT Filed: Apr. 19, 2006

(86) PCT No.: PCT/EP2006/003544
§ 371 (c)(1),
(2), (4) Date: Oct. 18, 2007

(87) PCT Pub. No.: WO2006/111358
PCT Pub. Date: Oct. 26, 2006

(65) Prior Publication Data
US 2009/0020616 A1 Jan. 22, 2009

(30) Foreign Application Priority Data
Apr. 20, 2005 (EP) .................................... 05008596

(51) Int. Cl.
*G06K 7/08* (2006.01)

(52) U.S. Cl.
USPC ............................................ 235/449; 235/488

(58) Field of Classification Search
USPC .......... 235/449, 380, 487, 488, 492, 486, 493
See application file for complete search history.

(56) References Cited

U.S. PATENT DOCUMENTS

| | | | | |
|---|---|---|---|---|
| 4,804,827 A | * | 2/1989 | Jung | 235/488 |
| 4,982,076 A | | 1/1991 | Fujita | |
| 5,237,164 A | * | 8/1993 | Takada | 235/487 |
| 5,844,230 A | * | 12/1998 | Lalonde | 235/487 |
| 5,883,377 A | * | 3/1999 | Chapin, Jr. | 235/493 |
| 7,487,908 B1 | * | 2/2009 | Cook et al. | 235/375 |

FOREIGN PATENT DOCUMENTS

| | | |
|---|---|---|
| EP | 0310707 | 4/1989 |
| EP | 0355162 | 2/1990 |
| GB | 1392038 | 4/1975 |
| WO | WO 03/091952 | * 11/2003 |
| WO | 2004/091930 | 10/2004 |

* cited by examiner

*Primary Examiner* — Thien M Le
(74) *Attorney, Agent, or Firm* — Wenderoth, Lind & Ponack, LLP

(57) ABSTRACT

A security element or film materials for data carriers, valuable documents, packing and the like. The security element includes a magnetic coding that is produced in situ. The invention also relates to a method and a device for producing the magnetic coding in situ.

25 Claims, 1 Drawing Sheet

SECURITY ELEMENT WITH SPATIALLY RESOLVED MAGNETIC CODING, METHOD AND DEVICE FOR THE PRODUCTION OF THE SAME AND ITS USE

BACKGROUND OF THE INVENTION

1. Technical Field

The present invention relates to a security element for data media, documents of value, packaging and the like, which comprises a spatially resolved magnetic coding.

2. Description of the Related Art

EP 0 516 790 B1 discloses a security document with a security element in the form of a filament or band of transparent synthetic material, which comprises a metallic layer with clearances in the form of symbols, patterns or the like, wherein over or beneath this metal layer a further magnetic layer is disposed such that at least the readable clearances remain free.

EP 0 310 707 B1 discloses a document with magnetically detectable security features that comprise regions of variable magnetic field strength.

However, in these known two-dimensional magnetic documents, the storage space for information is restricted to the two-dimensional orientation.

SUMMARY OF THE INVENTION

The present invention addresses the problem of providing a security element with magnetic coding in which a defined magnetic coding can be detected spatially resolved.

The subject matter of the invention is therefore a security feature with magnetic coding, characterized in that on one or several carrier substrates, flexibly connected with one another magnetic codings in two or more layers, are applied on different sides of the carrier substrate, optionally simultaneously with optional transparent clearances in the form of patterns, symbols, letters, geometric figures, lines, guilloches and the like, which can be spatially resolved, wherein the particular magnetic layers at least partially overlap.

The security feature according to the invention can be produced in a simple manner in the desired form and with the desired defined magnetic spatially resolved coding and offers increased protection against falsification and imitations. At identical areal density the security feature has a higher storage density.

DETAILED DESCRIPTION OF THE INVENTION

Figure 1:
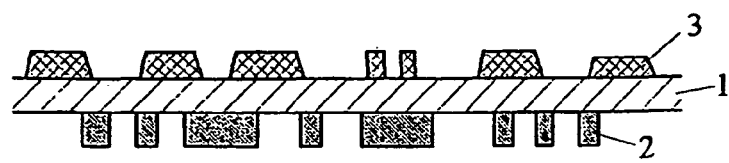
FIGS. 1-5 are cross-sectional views of embodiments of security elements constructed in accordance with the present invention.
Figure 2:
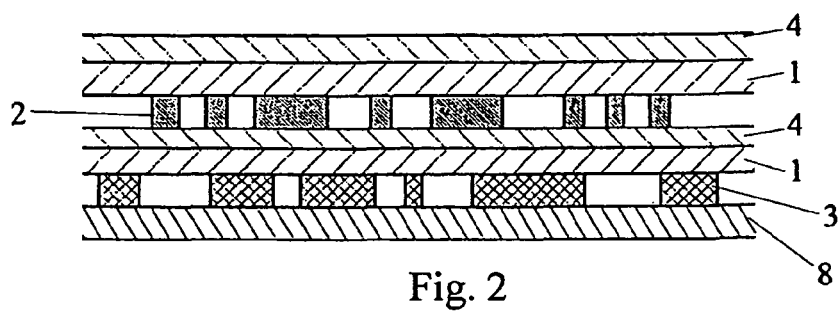
Figure 3:
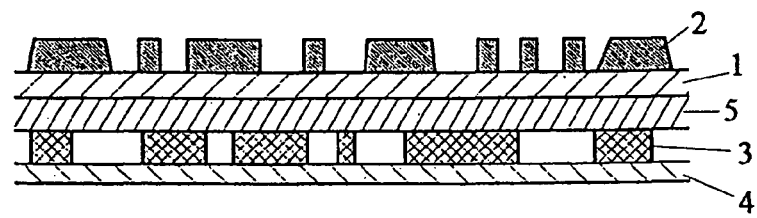
Figure 4:
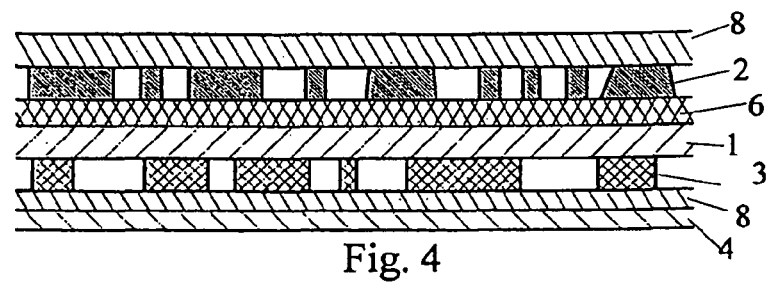
Figure 5:
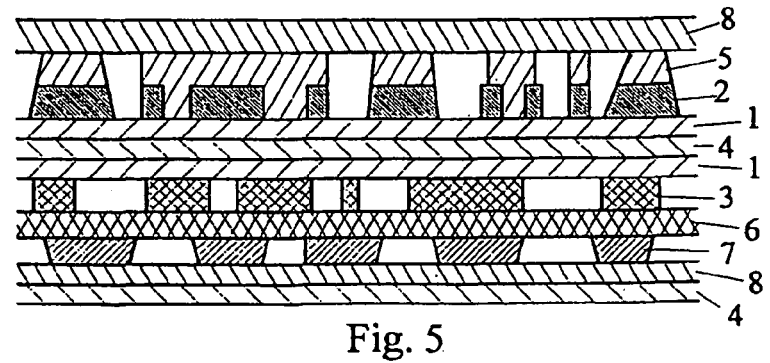

In FIGS. 1 to 5 embodiments according to the invention are depicted. In the figures, reference numeral 1 depicts a carrier substrate, reference numeral 2 depicts a first partial magnetic layer, reference numeral 3 depicts a second partial magnetic layer, reference numeral 4 depicts an adhesion promoter layer, for example a lamination adhesive layer, a heat- or cold-sealing adhesive layer, reference numerals 5, 6 and 7 depict further functional layers, and reference numeral 8 depicts a protective lacquer layer.

The security elements according to the invention, optionally after appropriate cutting-to-size (for example to filaments, bands, strips, patches or other formats) are therefore utilized as security features in data media, in particular valuable documents, such as identification cards, passports, cards, bank notes or labels and markers, seals and the like. However, the security elements can be used in packaging materials for sensitive goods, such as pharmaceutical products, foodstuff, cosmetics, data media, structural electronic components and the like. The security elements can further be applied on packaging materials for diverse goods, for example, onto foils and films, paper, packets, cardboard boxes and the like.

Carrier substrates for the security feature according to the invention to be considered are preferably flexible sheets of synthetic materials, for example of PI, PP, MOPP, PE, PPS, PEEK, PEK, PEI, PSU, PAEK, LCP, PEN, PBT, PET, PA, PC, COC, POM, ABS or PVC. The substrate sheets preferably have a thickness of 5-700 µm, preferably 5-200 µm, and especially preferred 5-50 µm.

Further, metal sheets, for example Al, Cu, Sn, Ni, Fe or special steel sheets having a thickness of 5-200 µm, preferably 10-80 µm, and especially preferred 20-50 µm, can also serve as the carrier substrate. The sheets can also be surface-treated, coated or laminated, for example with synthetic materials, or they can be lacquered.

As carrier substrates can further also be utilized paper or composites with paper, for example composites with synthetic materials having a mass per unit area of 20-500 g/m$^2$, preferably 40-200 g/m$^2$.

Further materials that can be utilized as carrier substrates textiles or nonwovens, such as continuous fiber nonwovens, staple fiber nonwovens, and the like, which may optionally be needled or calendered. Such textiles or nonwovens are preferably comprised of synthetic materials, such as PP, PET, PA, PPS and the like, but textiles or nonwovens of natural, optionally treated, fibers, such as viscose fiber nonwovens can be utilized. The utilized textiles or nonwovens have a mass per unit area of 20 g/m$^2$ to 500 g/m$^2$. These textiles or nonwovens can optionally be surface treated.

The carrier substrate is imprinted with an ink or a lacquer with magnetic properties.

Suitable for the production of coded magnetic features are magnetic inks capable of causing magnetic fields with high flux density or conducting magnetic fields of high density.

Especially suitable are magnetic pigment inks with pigments based on Fe oxides, such as $Fe_2O_3$ or $Fe_3O_4$. Iron, nickel, cobalt and their alloys, cobalt/samarium, barium or cobalt ferrites, hard and soft magnetic iron and steel types in aqueous or solvent-containing dispersions. Solvents to be considered are, for example, i-propanol, ethyl acetate, methyl ethyl ketone, methoxypropanol, aliphatic or aromatic compounds and their mixtures.

The pigments are preferably in acrylate polymer dispersions with a molecular weight of 150,000 to 300,000 in acrylate urethane dispersions, acrylate styrene or PVC-containing dispersions or in solvent-containing systems with identical binder base.

In particular, suitable are magnetic inks with pigments based on Cr/Ni steel, Al/$Fe_3O_4$ and the like. In contrast to the conventional magnetic inks, which appear black, brown or gray, these magnetic inks have a silvery appearance image and simultaneously have the above-described requisite magnetic properties. It becomes thereby possible to generate the metallic lustrous appearance desired or required for many applications already in one working step by printing these magnetic inks.

Printing-over or coating with metallic or metal layers for generating the desired appearance image is therefore not necessary, however, it can be carried out, for example, for the purpose of inserting further identification features without encountering problems.

Imprinting preferably takes place with the aid of a laser-exposed cylinder or a printing plate preferably using a gravure printing method, wherein the production master (cylinder or printing plate) is formed such that the coded magnetic layer can optionally be printed simultaneously with the symbols, pattern, letters, geometric figures, lines, guilloches and the like to be reproduced.

The magnetic printing ink is applied onto the carrier substrate in different thickness and form according to the surface of the production master in one work step.

Onto this coated carrier substrate subsequently a further carrier substrate can be applied with a magnetic coding, wherein the magnetic coding can be identical or different.

The two carrier substrates with the particular coded magnetic layers can be joined with one another in a known manner by lamination, by means of heat- or cold-sealing adhesives and the like.

The coded magnetic layers can further be applied on both sides of a single carrier substrate.

Thereby a spatially resolvable coded structure is generated which can be machine read.

Thereby, on the one hand, the magnetic characteristics of the two partial magnetic layers are detectable and also the magnetic properties of the two magnetic layers jointly. To the coding in the two dimensions in the filament plane, is thus added a further coding normal to the filament plane. The storage capacity per filament area can thereby be increased.

The particular carrier substrates can already comprise functional or decorative layers or further layers can be applied after the magnetically coded layer has been applied.

However, the carrier substrates can also already comprise additionally a lacquer or ink layer, which can be unstructured or structured, for example, it can be embossed. The lacquer layer can, for example, be a releasable transfer lacquer layer, it can be cross-linked or cross-linkable by radiation, for example UV radiation, and be prepared to be scratch-resistant and/or antistatic. Suitable are aqueous as well as solid lacquer systems, in particular lacquer systems based on polyester acrylate or epoxy acrylate, colophonium, acrylate, alkyd, melamine, PVA, PVC, isocyanate, urethane systems, which can be a conventionally or reactively curing mixture or be radiation-curing.

As ink or lacquer layers diverse compositions can be utilized in each instance. The composition of the individual layers can vary in particular according to their task, thus whether or not the individual layers serve decoration purposes exclusively or are to be a functional layer or whether the layer is to be a decoration as well as a functional layer.

These layers may be pigmented or not pigmented. As pigments, all known pigments can be utilized, such as, for example titanium dioxide, zinc sulfide, kaolin, ITO, ATO, FTO, aluminum, chromium and silicon oxides as well as colored pigments. Solvent-containing lacquer systems as well as systems without solvents are herein applicable.

As binders various natural or synthetic binders can be considered.

These further functional layers, already applied on the carrier substrate or applied subsequently can have, for example, certain chemical, physical and also optical properties.

The optical properties of a further layer can be affected by visible coloring substances or pigments, luminescent coloring substances or pigments, which fluoresce or phosphoresce in the visible range, the UV or in the IR range, effect pigments, such as liquid crystals, pearlescence, bronzes and/or multilayer color changing pigments and heat-sensitive colors or pigments. These can be employed in all possible combinations. In addition, phosphorescent pigments alone or in combination with other coloring substances and/or pigments can be utilized. Further, electrically conductive layers can also be provided on the substrate or can be applied subsequently, for example electrically conductive polymer layers or conductive ink or lacquer layers.

To set the electrical properties, the set electrical properties, for example conductivity, can be added to the ink to be applied or to the lacquer to be applied, for example graphite, carbon black, conductive organic or inorganic polymers, metal pigments (for example copper, aluminum, silver, gold, iron, chromium and the like), metal alloys, such as copper-zinc or copper-aluminum or also amorphous or crystalline ceramic pigments such as ITO, ATO, FTO and the like. Further, doped or non-doped semiconductors, such as for example silicon, germanium or doped or non-doped polymer semiconductor or ion conductors, such as amorphous or crystalline metal oxides or metal sulfides can also be utilized as additives. Further, for setting the electrical properties of the layer can be utilized or added to the lacquer polar or partially polar compounds, such as tensides or nonpolar compounds such as silicon additives or hygroscopic or non-hygroscopic salts.

As a layer with electric properties an all-over or partial metal layer can also be applied, wherein the partial application can take place by means of an etching process (application of an all-over metal layer and subsequent partial removal by etching) or by means of a demetalization process. When using a demetalization process, in a first step preferably an ink soluble in a solvent (optionally in the form of an inverse coding) is applied, subsequently, optionally after activation of the carrier substrate through a plasma or corona treatment, the metallic layer is applied, whereupon the soluble ink layer is detached through treatment with a suitable solvent together with the metallization present in this region.

Further, as the electrically conductive layer also an electrically conductive polymer layer can be applied. The electrically conductive polymers can be, for example, polyaniline or polyethylene dioxythiophene.

It is also feasible to add to the magnetic ink utilized, for example, carbon black or graphite, whereby simultaneously a magnetic as well as an electrically conductive layer is especially advantageously producible in defined coding according to the method of the present invention.

As additional security features, furthermore, additional surface relief structures, for example, diffraction gratings, holograms and the like are also to be considered, and these structures may optionally also be metalized or partially metalized.

For the production of such surface structures, first, UV-curable deep-drawable lacquer is applied.

A surface structure, for example, can subsequently be produced, by impressing a die into this lacquer which at the time of the impressing is pre-cured to the gel point, whereupon subsequently the radiation-curable lacquer is completely cured after the surface structure has been applied.

Due to the use of the UV-curable lacquer, after the curing of the layers applied thereon, an optionally emplaced surface structure is also stable under temperature loading.

The radiation-curable lacquer can be for example, a radiation-curable lacquer system based on a polyester, an epoxy or polyurethane system comprising two or more different photoinitiators, familiar to the person of ordinary skill in the art, which can initiate curing of the lacquer system to different extents at different wavelengths. Thus, for example, one photoinitiator can be activatable at a wavelength of 200 to 400 nm, the second photoinitiator then at a wavelength of 370 to 600 nm. Between the activation wavelengths of the two photoinitiators a sufficient interval should be maintained so that the excitation of the second photoinitiator is not too strong while the first is being activated. The range in which the second photoinitiator is excited should be within the transmission wavelength range of the carrier substrate utilized. For the main curing process (activation of the second photoinitiator), electron radiation can also be utilized.

A lacquer that is dilutable with water can also be utilized as the radiation-curable lacquer. Preferred are lacquer systems based on polyester.

The security elements according to the invention can further be provided with a protective lacquer layer on one or both sides. The protective lacquer can be pigmented or not pigmented, wherein, as the pigments, all known pigments of coloring substances can be utilized, for example $TiO_2$, ZnS, kaolin, ATO, FTO, aluminum, chromium and silicon oxides or, for example, organic pigments such as phthalocyanine blue, i-indolide yellow, dioxazine violet and the like. Further, luminescent coloring substances or pigments can be added, which fluoresce or phosphoresce in the visible range, the UV range or in the IR range, effect pigments such as liquid crystals, pearlescence, bronzes and/or multilayer color change pigments and heat-sensitive inks or pigments. These can be applied in all possible combinations. In addition, phosphorescent pigments alone or in combination with other coloring substances and/or pigments can also be utilized.

For the protection of the coded magnetic layers, the structure can subsequently be laminated with a further carrier substrate or be provided with a protective layer in the form of a known protective lacquer or of a thermoplastic or radiation-curable embossing lacquer.

The security element according to the invention can further be provided with a heat- or cold-sealing adhesive or a self-adhesive coating for the application onto the valuable document to be protected or a packaging.

The invention claimed is:

1. A security feature with magnetic coding, the security feature comprising:
   at least one carrier substrate;
   a first magnetic coding on a first side of the carrier substrate, the first magnetic coding being applied in a partial layer on the first side of the carrier substrate; and
   a second magnetic coding on a second side of the carrier substrate, the second magnetic coding being applied in a partial layer on the second side of the carrier substrate;
   wherein the partial layers of the first and second magnetic codings are formed with transparent clearances in the form of patterns, symbols, letters, geometric figures, lines, or guilloches,
   wherein the first and second magnetic codings are applied in different thicknesses and are formed in a spatially resolved arrangement, and
   wherein the partial layers of the first and second magnetic codings at least partially overlap.

2. The security feature as claimed in claim 1, wherein the carrier substrate additionally has further functional and/or decorative layers.

3. The security feature as claimed in claim 2, wherein the carrier substrate additionally has electrically conductive and/or optically effective and/or coloring layers.

4. The security feature as claimed in claim 2, wherein the functional and/or decorative layers cover the carrier substrate over the entire surface or partially.

5. The security feature as claimed in claim 2, wherein the security element is provided with a protective lacquer layer on one or both sides.

6. The security feature as claimed in claim 5, wherein the protective lacquer layer is pigmented.

7. The security feature as claimed in claim 1, wherein the security element is laminated with a carrier substrate.

8. The security feature as claimed in claim 7, wherein the lamination adhesive is pigmented.

9. The security feature as claimed in claim 1, further comprising a heat- or cold-sealing adhesive or a self-adhesive coating provided on at least one side of the carrier substrate.

10. The security feature as claimed in claim 9, wherein the heat- or cold-sealing adhesive or the self-adhesive coating is applied to the at least one side of the carrier substrate over the entire surface or partially.

11. The security feature as claimed in claim 10, wherein the heat- or cold-sealing adhesive or the self-adhesive coating is pigmented.

12. Documents comprising the security feature as claimed in claim 1.

13. Valuable papers and financial securities, which comprise at least the security feature as claimed in claim 1, embedded over the entire surface or partially in the form of a filament, a window filament or a patch or at least applied partially on one or both surfaces.

14. Packaging comprising the security feature as claimed in claim 1.

15. Sheet material with magnetic coding, comprising:
   at least one carrier substrate;
   a first magnetic coding applied to a first side of the carrier substrate, the first magnetic coding being applied to the first side of the carrier substrate in a partial layer; and
   a second magnetic coding applied to a second side of the carrier substrate, the second magnetic coding being applied to the second side of the carrier substrate in a partial layer,
   wherein the partial layers of the first and second magnetic codings are formed with transparent clearances in the form of patterns, symbols, letters, geometric figures, lines, or guilloches,
   wherein the first and second magnetic codings are applied in different thicknesses and are formed in a spatially resolved arrangement, and
   wherein the partial layers of the first and second magnetic codings at least partially overlap.

16. The sheet material as claimed in claim 15, wherein the carrier substrate comprises functional and/or decorative layers.

17. The sheet material as claimed in claim 16, wherein the carrier substrates comprises electrically conductive and/or optically effective and/or coloring layers.

18. The sheet material as claimed in claim 16, wherein the partial layers of the magnetic codings are provided over the entire surface or partially on the carrier substrate.

19. The sheet material as claimed in claim 15, wherein the sheet material is provided on one or both sides with a protective lacquer layer.

20. The sheet material as claimed in claim 19, wherein the protective lacquer layer is pigmented.

21. The sheet material as claimed in claim 15, wherein the sheet material is laminated with two or more carrier substrates which comprises the functional and/or decorative layers.

22. The sheet material as claimed in claim 21, wherein the sheet material is laminated with a lamination adhesive, and the lamination adhesive is pigmented.

23. The sheet material as claimed in claim 15, further comprising a heat- or cold-sealing adhesive or a self-adhesive coating provided on at least one side of the carrier substrate.

24. The sheet material as claimed in claim 23, wherein the heat- or cold-sealing adhesive or the self-adhesive coating is applied to the at least one side of the carrier substrate over the entire surface or partially.

25. The sheet material as claimed in claim 24, wherein the heat- or cold-sealing adhesive or the self-adhesive coating is pigmented.

\* \* \* \* \*